United States Patent
Smith et al.

(10) Patent No.: US 11,155,742 B2
(45) Date of Patent: Oct. 26, 2021

(54) DRILL FLUID AND METHOD FOR TUNNELING

(71) Applicant: CANADIAN ENERGY SERVICES L.P., Calgary (CA)

(72) Inventors: Carl Keith Smith, Calgary (CA); Josh Gawryluk, Turner Valley (CA)

(73) Assignee: Canadian Energy Services L.P., Calgary (CA)

(*) Notice: Subject to any disclaimer, the term of this patent is extended or adjusted under 35 U.S.C. 154(b) by 0 days.

(21) Appl. No.: 16/317,259

(22) PCT Filed: Jun. 22, 2018

(86) PCT No.: PCT/CA2018/050777
§ 371 (c)(1),
(2) Date: Jan. 11, 2019

(87) PCT Pub. No.: WO2018/232532
PCT Pub. Date: Dec. 27, 2018

(65) Prior Publication Data
US 2019/0316019 A1 Oct. 17, 2019

Related U.S. Application Data

(63) Continuation-in-part of application No. 15/451,002, filed on Mar. 6, 2017, now Pat. No. 10,202,532.

(60) Provisional application No. 62/524,361, filed on Jun. 23, 2017.

(51) Int. Cl.
C09K 8/05 (2006.01)
C09K 8/20 (2006.01)
E21B 21/06 (2006.01)
E21B 21/00 (2006.01)

(52) U.S. Cl.
CPC .......... *C09K 8/05* (2013.01); *C09K 8/203* (2013.01); *C09K 8/206* (2013.01); *E21B 21/003* (2013.01); *E21B 21/062* (2013.01)

(58) Field of Classification Search
CPC ...... E21B 21/003; E21B 21/062; E21B 43/26; E21B 21/00; E21B 33/14; C09K 8/05; C09K 2208/34; C09K 8/46; C09K 8/206; C09K 8/035; C09K 8/08; C09K 8/16
See application file for complete search history.

(56) References Cited

U.S. PATENT DOCUMENTS

| | | |
|---|---|---|
| 3,236,769 A | 2/1966 | Burdyn et al. |
| 3,654,164 A | 4/1972 | Sperry |
| 4,464,818 A | 8/1984 | Kubota |
| 4,495,800 A | 1/1985 | Wilcox |
| 4,664,843 A | 5/1987 | Burba, III et al. |
| 4,921,621 A * | 5/1990 | Costello ............... C09K 8/22 507/120 |
| 5,244,877 A | 9/1993 | Elward-Berry |
| 5,260,269 A | 11/1993 | Hale et al. |
| 5,337,824 A | 8/1994 | Cowan |
| 5,351,759 A | 10/1994 | Nahm et al. |
| 5,363,918 A | 11/1994 | Cowan et al. |
| 5,439,056 A | 8/1995 | Cowan |
| 5,821,203 A | 10/1998 | Williamson |
| 5,975,220 A | 11/1999 | Mueller et al. |
| 6,025,303 A | 2/2000 | Keilhofer et al. |
| 6,148,917 A | 11/2000 | Brookey et al. |
| 7,199,085 B2 | 4/2007 | Rea et al. |
| 9,267,068 B1 | 2/2016 | Jiang et al. |
| 2003/0078306 A1 | 4/2003 | Hoy |
| 2003/0176292 A1 * | 9/2003 | Rayborn ............... C09K 8/16 507/100 |
| 2003/0201103 A1 | 10/2003 | Brookey et al. |
| 2004/0099446 A1 | 5/2004 | Schlemmer |
| 2005/0003967 A1 | 1/2005 | Rea et al. |
| 2005/0022992 A1 | 2/2005 | Di Lullo Arias et al. |
| 2006/0019834 A1 | 1/2006 | Melbouci et al. |
| 2007/0135311 A1 | 6/2007 | Van Der Horst |
| 2007/0197399 A1 | 8/2007 | Sau et al. |
| 2010/0089650 A1 | 4/2010 | Stoian et al. |
| 2013/0126243 A1 | 5/2013 | Smith |
| 2013/0206479 A1 | 8/2013 | Smith |

FOREIGN PATENT DOCUMENTS

| | | |
|---|---|---|
| CA | 2679922 | 9/2008 |
| CA | 2802048 | 7/2014 |
| CN | 1560180 | 1/2006 |
| CN | 1696240 | 12/2006 |
| WO | 1994009250 A1 | 4/1994 |
| WO | 2012/024786 | 3/2012 |

* cited by examiner

*Primary Examiner* — Zakiya W Bates
(74) *Attorney, Agent, or Firm* — Bennett Jones LLP

(57) ABSTRACT

A method for drilling a tunnel through a formation must address environmental concerns. One tunneling method comprises the steps of: preparing a mixed metal-viscosified drilling fluid including bentonite, a mixed metal viscosifier and controlling pH to 8.5 to 9.5 to permit a reaction between the bentonite and the mixed metal viscosifier; adding at least one of: (i) calcium sulfate and (ii) a potassium salt; and pumping the drilling fluid while drilling the tunnel with the pH lowered to 7-9. The amount of mixed metal viscosifier used can be limited such that the weight ratio of mixed metal viscosifier to MBT reaches up to 1:30. In the event that there is a problematic increase in viscosity, a non-toxic anionic thinner can be added to the drilling fluid. One such anionic thinner is a polyacrylate.

51 Claims, No Drawings

DRILL FLUID AND METHOD FOR TUNNELING

FIELD

This invention relates to drilling fluids and methods boring a subterranean tunnel through a formation, such as for pipelines.

BACKGROUND

In the tunnel boring process, a drill bit, mud motor and other drilling assembly components including reamers are used to bore a tunnel below a river, a lake, an ocean strait, a road or other obstacle. A drilling fluid with specific physical properties is circulated down through a drill pipe, out through the bit and up the annulus in order to clean the tunnel. In some situations the fluid is pumped out the drill pipe and suspends drilled cuttings that must be pushed out the other end of the tunnel.

Pipeline tunnel boring is an operation that is required to safely place pipelines, such as those used for transmitting oil, gas, water, sewage, below rivers, ocean straits, roads, lakes and other such natural and man-made obstacles in an efficient and environmentally safe manner. Pipeline boring involves the use of a rotary drilling rig or sometimes two rigs with one rig on either side of a river for example. The drilling process typically involves a drill bit with a directional motor assembly that is capable of steering the drilling down, then to horizontal and then up to the surface on the other side of the obstacle (for example the opposite side of a river). The process of tunnel boring has a number of unique technical challenges.

The size of the tunnels varies but the most challenging tunnels have diameters in the range of 30 to 80 inches, for example about 50 to 60 inches with one common tunnel size being 1371.6 mm (54"). The length of the tunnel from its surface entry point to its exit can be in the order of kilometers. They are often drilled in very young formations that can contain a very large fraction of easily hydratable clays or loose tills. In addition, the true vertical depths are often 100 m or less. The fracture gradients of the formations drilled can be low and it is possible to induce fractures to surface (underneath a river for example) with the result of whole losses of the circulating drilling fluid. It is possible that such fractures will communicate with the surface with the result that the surface becomes contaminated with the drilling fluid. For example, it is a significant concern that an environmentally sensitive area such as a river becomes contaminated with drilling fluid. It is possible that such contamination results in the problematic accumulation of the fluid in the environment.

Other formation types encountered while drilling pipeline tunnels can include carbonates which may be naturally fractured and which can also be the source of losses, sandstones that can be very permeable, can be the source of losses. Such losses may either dissipate into the subterranean formation or communicate with the surface as an outcrop. Gravel deposits can cause losses and also sometimes require the fluid conveyed removal of very large rocks out of the tunnel. Coal and lignite can also be encountered and these can result in losses to friable and fractured formations or result in tunnel borehole instability due to the weakness of the formations. There can also be problems with the interaction of coal or lignite with the components used to viscosify the drilling fluid (usually evidenced by thinning) and this can result in increased difficulties cleaning the tunnel borehole of drilled cuttings.

For larger diameter tunnel bores, the process of drilling can include drilling a smaller diameter pilot hole and then deploying an expandable reamer that scrapes the tunnel borehole walls and increases the diameter on one or more subsequent passes to the required size.

The engineering parameters coupled with the equipment and techniques deployed can present challenges. For example, current equipment used have limited fluid pump capacity and, for very large diameter tunnel boreholes, the fluid annular velocity can be very low. It is possible that drilled cuttings accumulate and if not remedied will result in the drilled cuttings plugging the tunnel borehole and restricting the fluid flow to the point that the tunnel borehole pressures up. If this occurs, there can be induced fracturing of the formation being bored with the subsequent loss of fluid to either subterranean formations or, in the worst cases, to surface.

SUMMARY

In one aspect of the invention, there is provided a method for drilling a tunnel through a formation, the method comprising: preparing a mixed metal-viscosified drilling fluid including bentonite, a mixed metal viscosifier and controlling pH to 8.5 to 9.5 to permit a reaction between the bentonite and the mixed metal viscosifier; adding at least one of: (i) calcium sulfate and (ii) a potassium salt; and pumping the drilling fluid while drilling the tunnel with the pH lowered to 7-9.

In accordance with another aspect of the present invention, there is provided a method for drilling a tunnel through a formation, the method comprising: providing a mixed metal-viscosified drilling fluid; circulating the drilling fluid through the tunnel while drilling into the formation; monitoring the drilling fluid for a condition of drilling indicative of a problematic increase in viscosity of the drilling fluid; adding to the drilling fluid at least 1% w/v potassium salt; and adding a non-toxic anionic thinner to the drilling fluid to adjust the viscosity of the drilling fluid.

In accordance with another aspect of the present invention, there is provided a method for drilling a tunnel through a formation, the method comprising: providing a mixed metal-viscosified drilling fluid; circulating the drilling fluid through the tunnel while drilling into the formation; monitoring the drilling fluid for a condition of drilling indicative of a problematic increase in viscosity of the drilling fluid; adding calcium sulfate to the drilling fluid to bring the concentration to at least 0.05% w/v calcium sulfate in the drilling fluid; and adding a non-toxic anionic thinner to the drilling fluid to adjust the viscosity of the drilling fluid.

In accordance with another aspect of the present invention, there is provided a mixed metal-viscosified drilling fluid comprising: water; 15 to 45 kg/m3 bentonite; a mixed metal viscosifier at a weight ratio of 1:3 to 1:30, viscosifier to bentonite; at least 0.05% w/v calcium sulfate and/or at least 1% w/v potassium salt; a polyacrylate anionic thinner; and a base to maintain the pH above 7.0.

In accordance with another aspect of the present invention, there is provided a method for boring a tunnel including circulating an MMH-based drilling fluid with a non-toxic anionic additive. The fluid is able to incorporate a large amount of reactive clays and a non-toxic anionic thinner reduces the viscosity in a controlled manner and is environmentally acceptable.

It is to be understood that other aspects of the present invention will become readily apparent to those skilled in the art from the following detailed description, wherein various embodiments of the invention are shown and described by way of example. As will be realized, the invention is capable for other and different embodiments and its several details are capable of modification in various other respects, all without departing from the spirit and scope of the present invention.

Accordingly the detailed description and examples are to be regarded as illustrative in nature and not as restrictive.

DESCRIPTION OF VARIOUS EMBODIMENTS

The detailed description and examples set forth below are intended as a description of various embodiments of the present invention and are not intended to represent the only embodiments contemplated by the inventor. The detailed description includes specific details for the purpose of providing a comprehensive understanding of the present invention. However, it will be apparent to those skilled in the art that the present invention may be practiced without these specific details.

While other drilling systems by the present applicant can be useful for drilling boreholes of all kinds including those for tunnels, a number of environmental and other issues have been considered for the drilling fluids used in this process due to the possibility of exposure to the ecosystems in surface soil, ground water, rivers, oceans and wildlife habitats. These include:
1) Toxicity—there are restrictions on the toxicity of drilling fluid components: all components must be non-toxic. Many components used in conventional oil and gas drilling fluids cannot be used;
2) pH—usually restricted to 6.0-9.5 range;
3) Density—high fluid density can result in induced fracturing of formations; and
4) Aqueous—All fluids must be water based—For boring under ocean straits the base fluid may be sea water.

Mixed metal-viscosified drilling fluids include a mixed metal viscosifier, which is an inorganic particle based on magnesium/aluminum oxides and/or hydroxides. They are commonly known as mixed metal hydroxides and sometimes referred to as mixed metal oxide (MMO), mixed metal hydroxide (MMH) and combinations of mixed metal oxide and hydroxide (MMOH). Mixed metal viscosifier, sometimes collectively referred to as MMH, is a mixed metal layered hydroxide compound of the following empirical formula:

$$M'_m M''_n (OH)_{(2m+3n+qa+br)}(A^q)_a(B^r)_b \cdot xH_2O,$$

where M' represents at least one divalent metal cation and m is an amount of from greater than zero to about 8; where M" represents at least one trivalent metal cation and n is an amount of from greater than zero to about 6; where A is an anion or negative-valence radical that is monovalent or polyvalent, and a is an amount of A ions of valence q, provided that if A is monovalent, a is from greater than zero to about 8, and if A is polyvalent, a is from greater than zero to about 4; where B is a second anion or negative-valence radical that is monovalent or polyvalent, and where b is an amount of B ions of valence r and b is from zero to about 4; provided (m+n) is greater than or equal to 1; further provided qa+br cannot be greater than 2m+3n; provided that qa cannot equal 2m+3n; and still further provided that (2m+3n+qa+br) is less than 3; and where $xH_2O$ represents excess waters of hydration, with x being zero or more. In certain preferred embodiments (2m+3n+qa+br) is less than 2, more preferably less than 1, and most preferably less than 0.5.

While M' can represent any divalent metal cation of the Groups IA, IIA, VIIB, VIII, IB or IIB of the Periodic Table, preferred divalent cations are Mg, Ca, Mn, Fe, Co, Ni, Cu, and Zn, and more preferred are Mg and Ca. M" is a trivalent metal cation selected from Groups IA or VIII, but preferred are Al, Ga and Fe, and more preferred is Al.

There must also be present at least one anion or negative-valence radical, A, and in some cases one (or more) additional anions or negative-valence radicals, B, may also be present. Examples of these anions and negative-valence radicals include carbonates, amines, amides, chlorides, oxides, and the like. Preferred therefor are carbonates, oxides, chlorides and amides.

Alternatively, a combination of materials which can contribute the proportions of constituents of the above empirical formula can be employed.

One mixed metal viscosifier of interest is the mixed metal hydroxide of the formula $[Mg_{0.7}Al_{0.3}(OH)_2](OH)_{0.3}$. Another mixed metal viscosifier of interest is Al/Mg(OH)$_{4.7}Cl_{0.3}$. Mixed metal viscosifiers are commercially available such as from BASF Oilfield Polymers Inc. under the trademark Polyvis™. For example, Polyvis II™ is a mixed metal hydroxide viscosifier.

Mixed metal viscosified drilling fluids have become more popular recently due to the present applicant's efforts to employ salts in the fluids that reduce or prevent the thinning effect from drilling coals with MMH viscosified fluids. Calcium sulfate and/or potassium salts including one or more of potassium sulfate, potassium chloride, potassium acetate and potassium formate may substantially maintain the rheology of mixed metal-viscosified drilling fluids when drilling with coal contaminants. Such salts may add a benefit of shale swelling inhibition, possibly as a result of the presence of the potassium ion or calcium ion from the salt. The salts are believed to protect the electrostatic relationship between the clay and the viscosifier.

These MMH-based fluids are excellent hole cleaning fluids and in many ways are well suited for applications such as tunneling. However, the fluids are pH dependent and require a basic pH to maintain appropriate rheology. Also, the MMH additive interacts strongly with the young high reactive clays that can be incorporated through a tunneling process. Clay incorporation can result in a dramatic and sometimes uncontrollable increase in fluid viscosity.

Surprisingly, however, methods have been found for tunneling with MMH-based fluids and, in fact, these fluids have proven to be valuable to address holes where there is the risk of significant fluid loss such as is encountered in tunneling for pipeline installs. In one embodiment, a method for tunneling employs a drilling fluid that is water-based, pH controlled and includes bentonite, a mixed metal viscosifier and at least one of: (i) calcium sulfate and/or (ii) potassium salts including one or more of potassium sulfate, potassium chloride, potassium acetate and potassium formate. Calcium sulfate (gypsum) has proven to be quite useful.

In an MMH-based fluid including calcium sulfate, concentrations of calcium sulfate greater than 0.05% (weight by volume) may be effective in the mixed metal-viscosified drilling fluid. While amounts of up to 5% or more may be used, generally concentrations of 0.05%-1.0% (weight by volume) calcium sulfate and, for example, 0.05-0.5% salt (weight by volume) or 0.1-0.5% concentrations have been found to be both effective for stabilizing the drilling fluid against adverse rheological changes and advantageous in terms of economics. These fluids have been employed for drilling coals. For example, in younger coals or where significant coal deposits must be drilled, higher concentrations (for example greater than 0.3% and for example 0.3-1.0%) of calcium sulfate in the drilling fluid may be useful. It is believed that the calcium sulfate reaches saturation at about 2 to 3 kg/m3, (0.2 to 0.3% (w/v)), but excess amounts may be added without an adverse effect and in fact may create a buffer of salt to maintain activity, provided the fluid remains a liquid which can be circulated through the tunnel borehole. Generally, based on a cost/benefit analysis, an upper limit of 1.0% or more likely 0.5% is considered sound.

With respect to potassium salts, potassium sulfate and/or potassium chloride have shown the best results with potassium sulfate being particularly preferred. A wide range of potassium salt concentrations, such as concentrations greater than 1 (weight by volume), may be effective in the mixed metal-viscosified drilling fluid.

Generally concentrations of 1-10% (weight by volume) salt and, for example, 1-5% salt (weight by volume) concentrations have been found to be both effective for stabilizing the drilling fluid against adverse rheological changes due to coal contamination and advantageous in terms of economics. The amount of salt added to the drilling fluid may be determined by the amount of coal to be drilled and/or by the shale reactivity. For example, younger coals, more so than older coals, tend to create greater rheological instability for mixed metal-viscosified drilling fluids and, thus, higher concentrations (for example greater than 3% and for example 3-10%) of potassium salts in the drilling fluid may be useful. Also, if it is determined that there are significant coal deposits through which the tunnel must be drilled, again higher concentrations of potassium salts may be useful.

Bentonite, which is a form of clay, is commonly used in drilling fluids and its use will be well understood by those skilled in the art. In this method, various types of bentonite are useful such as polymer-treated bentonite, untreated bentonite. An untreated bentonite may be particularly useful. Such a bentonite may be known commercially as untreated bentonite with a high content of sodium montmorillonite, natural bentonite or untreated Wyoming bentonite.

Generally, mixed metal-viscosified drilling fluids are made up with low concentrations of bentonite such as, for example, about 15 to 45 kg/m3 or 20 to 40 kg/m3 bentonite in fresh water. Sea water-based mixed metal-viscosified drilling fluids can accommodate more bentonite, as will be appreciated. Considering that many bentonite based (non-mixed metal) drilling fluids can contain many multiples more (i.e. two to four times) bentonite than in a mixed metal-viscosified drilling fluid, it can be appreciated that the viscosity generated using such low concentrations of bentonite for mixed metal-viscosified drilling fluids might be insufficient for hole cleaning.

The addition of mixed metal oxide, mixed metal hydroxide or mixed metal oxide and hydroxide at a weight ratio of 1:3 to 1:20, 1:7 to 1:12 or 1:8 to 1:10.5 to the added bentonite produces a stable fluid. When tunneling, contact with clays in the formation may drive the actual clay concentration up considerably. As mentioned, the rheology of mixed metal-viscosified drilling fluids is sensitive to increases in clay content, as may occur when drilling young, sedimentary formations, which are the common formations bored during tunnel boring. As noted above, mixed metal-viscosified drilling fluid systems can only operate within a relatively narrow range of active clay concentrations. If such a system does incorporate a significant amount of water-reactive clays, it will develop a problematic rheological profile for example a large increase in viscosity. While, as noted above, MMH-viscosified fluids had been shown to react adversely to high clay loading, in the current method, drilling at depths of less than 100 m proceeds successfully even with high clay to MMH ratios. After drilling is initiated with the initial drilling fluid wherein MMH is at a weight ratio of 1:3 to 1:20 to the added bentonite, drilling can proceed with only limited addition of, or without adding, further MMH viscosifier to maintain that ratio. It is noted that a methylene blue test (MBT) procedure can be employed to quantitatively analyze the drilling fluid clay content (both added and entrained by drilling). In one embodiment, the method includes preparing a drilling fluid wherein MMH is at a weight ratio of 1:3 to 1:20 to the added bentonite. This may include making up the drilling fluid with slightly less bentonite than previously used, such as a weight ratio of 1:3 to 1:12 or 1:7 to 1:9:5 MMH:added bentonite. The drilling fluid will also include the salt:calcium sulfate or potassium salts. Then, after commencing drilling, the method can include continuing to pump the drilling fluid with the MMH:total clay (for example as determined by MBT) being up to 1:30, for example, in the range of 1:20-1:30. This method includes drilling into young reactive clays and a portion of the total clay arising from the entrainment of young reactive clays. In some methods, the drilling fluid's total clay is in excess of 100 kg/m3. As drilling proceeds, further amounts of the salt may be added to maintain the salt concentrations noted above. Possibly, MMH may be added in limited quantities. However, it may not be necessary to add further bentonite, as its concentration will be maintained by entrained clays. This offers a considerable cost savings on chemicals and is environmentally advantageous, since any chemical load on the environment is significantly reduced.

As noted above, the MMH-viscosified fluids are considered pH sensitive. In order to create a stable fluid, prior methods raised the pH to greater than 10. However, the current method includes mixing the bentonite, MMH and calcium sulfate or potassium salt and, in order to trigger the reaction between the MMH and the bentonite, bringing the pH to 8.5 to 9.5 by addition of caustic soda, caustic potash, potassium carbonate, lime and/or soda ash. Then, once the bentonite/mixed metal viscosifier reaction is complete and a gel is formed, the drilling fluid can be pumped with the pH lowered to between pH 7 and 9 without a problematic loss in viscosity. Caustic soda, caustic potash, potassium carbonate, lime and/or soda ash may be added to control the pH in the range of 7-9. If environmental toxicity is a concern, pH control may use lime.

In the fluid with lower pH, the higher MBTs noted above can be more readily achieved. It is believed that the pH 7-9 reduces the density of anionic charge around the clay platelets and attenuates the interaction between cationic clay platelet faces and the overall anionic edges.

In one embodiment, a mixed metal-viscosified drilling fluid may include an aqueous mixture of about 20 to 30 kg/m3 bentonite, a mixed metal moiety in a quantity of about 1:7 to 1:10 MMO, MMH or MMOH to bentonite, pH controlled to pH 8.5-9.5 and 1 to 5% potassium salt and/or 0.05 to 1.0% calcium sulphate. After the gel forms, the pH may be reduced to pH 7-9.

Additives for fluid loss control, lost circulation, etc. may be added to the drilling fluid mixture, as desired. Non or minor-ionic additives may be most useful. Some examples may include starch for fluid loss reduction, organophillic lost circulation materials (LCM), etc. Simple testing may verify the compatibility of any particular additive with the drilling fluid.

To produce the drilling fluid, the bentonite may first be hydrated in water. Then the mixed metal moiety is added and pH is adjusted. The potassium/calcium salt can be added to the aqueous mixture of bentonite and mixed metal at any time. Additives such as LCM, fluid loss control agents, etc. can also be added when appropriate, as will be appreciated.

As will be appreciated, the drilling fluid may be circulated through the drill string, drill bit and tunnel bore annulus while drilling. Circulation of the drilling fluid may continue even when drilling is stopped in order to condition the well, prevent string sticking, etc.

During the drilling and circulation, the yield point of the drilling fluid may be maintained above 10 Pa to provide advantageous effects.

The mixed metal-viscosified drilling fluids described herein are useful for boring into various types of formations. Even when contacting coal or clay, such fluids retain their advantageous properties such as relatively high yield points, high low end rheology and high and fragile gel strengths. Such properties are advantageous for use in boring tunnels, whether vertical, directional or horizontal due to superior hole cleaning capabilities and because these fluids mitigate against whole mud fluid losses to formations whether via formation fractures or high permeability sections.

While the tunnel will generally be drilled to a depth of less than 100 m, the tunnel can be at any depth, any orientation and through any rock type, such as for example, through gravels, clay, carbonates, sandstones, shales, coal, oil shales, etc. The formation can be one known to contain clay and/or coal or otherwise.

The addition of salts, such as for example calcium sulfate, in sufficient amounts as noted above, prevents the collapse of the unique visco-elastic properties of the MMH-bentonite fluids when exposed to coal or lignite almost completely and it is possible to drill through coal seams, even horizontally where significant coal contact may be encountered. The use of such a fluid mitigates against whole fluid loss into the coal formation, which are typically highly fractured due to the unique rheological properties of the fluid.

The present method is suitable for drilling with clay loading in excess of what was previously thought possible. However, even with the present method, incorporating very high concentrations of clay may risk problematic rheology and may stress pumping systems. In fact, drilling with the present drilling fluid through active, young clay zones, with unavoidable incorporation of clay to excessive MBTs, may increase fluid rheology, such that the drilling fluid may become substantially un-usable (i.e. unpumpable).

Thus, in one embodiment, a method for boring a tunnel through a formation includes: adding a non-toxic anionic thinner to the drilling fluid to adjust the viscosity of the drilling fluid. One method for example, includes: providing a mixed metal-viscosified drilling fluid; circulating the drilling fluid through the bore hole while boring into the formation; adding calcium sulfate to the drilling fluid to bring the concentration to 0.05 to 1.0% w/v calcium sulfate; and adding a non-toxic anionic thinner to the drilling fluid to adjust the viscosity of the drilling fluid.

Alternately, at least 1% w/v potassium salt, as described above, may be employed in the method in place of or in addition to the calcium salt.

Without the addition of a potassium salt or the calcium sulfate, the use of anionic thinners would reduce the viscosity of the mixed metal-viscosified drilling fluid to nearly that of water. Without the use of an anionic thinner, the fluid may become unworkably viscous when drilling into clay.

In this embodiment, the mixed metal-viscosified drilling fluid can be according to that described above: an aqueous mixture of a mixed metal viscosifier, as described above, and bentonite, as described above, with pH control between 7-9.5, possibly with the method as described above, and a non-toxic anionic thinner.

The drilling fluid including the anionic thinner can be employed for the entire tunnel boring project or in response to identifying a condition of problematic rheological change such as one indicative of a problematic increase in the clay content of the drilling fluid. For example, the step of identifying may consider the location of the hole being drilling, for example using drilling measurements, relative to the location of known clay deposits, for example using formation logs or offset coring. If it is determined that the hole being drilled may, or is going to, pass through problematic clay deposits, then this can be noted according to the method and the step of adding an anionic thinner may be initiated when or before the drilling process begins in the clay deposit.

The salt (potassium salt and/or calcium sulfate) may be added to the drilling fluid at any time. For example, the salt may be added during the initial production of the drilling fluid, such that the salt is present in the system throughout the drilling operation or the salt may be added only after identifying a condition of drilling indicative of an increase in the clay content of the drilling fluid. Although the salt may be added after problematic clay contamination occurs, it is recommended to pre-treat the system for best results. In one embodiment, for example, the initial hole can be drilled down to approximately the level of the first clay deposit using any drilling fluid of interest, including for example, prior art mixed metal-viscosified drilling fluids. When it is determined that a clay deposit is close below bottom hole or when the clay deposit has been reached, the drilling fluid may be changed over to one including a mixed metal-viscosified drilling fluid containing an amount of the salt and the anionic thinner.

Alternately, the borehole may be drilled down to and into a clay deposit using a mixed metal-viscosified drilling fluid containing greater than 1% w/v potassium salt and/or greater than 0.05% calcium sulfate and then the anionic thinner may be added.

As another example, the entire tunnel substantially from surface, which may include drilling from surface or from below the overburden, may be drilled using a drilling fluid including a mixed metal viscosifier, bentonite, the appropriate amount of the salt and the non-toxic anionic thinner.

The anionic thinner could be added at any time. In one embodiment, the entire tunnel is bored using the fluid with the non-toxic anionic thinner. In another embodiment, the anionic thinner may be added to the drilling fluid after identifying a condition indicating a problem with the fluid such as a risk of fluid loss or that the drilling fluid has an increased clay concentration. For example, the anionic thinner may be added when it is expected that the tunnel borehole is to be drilled into a clay deposit.

Alternately or in addition, fluid rheology can be monitored, the viscosity of the fluid can be measured or the concentration of clay in the drilling fluid can be monitored directly to identify a condition indicative of an increase in the clay concentration. In one embodiment, for example, the MBT procedure can be employed to quantitatively analyze the clay content of the drilling fluid. In another embodiment, the fluid viscosity may be monitored as by determining the funnel viscosity or more accurately with a device such as a rheometer, such as a Fann 35 rheometer.

When the viscosity increases beyond an acceptable level, a condition indicative of an increase in clay content is identified. Once the clay concentration or the viscosity indicates a problematic condition, the thinner may be added. In one embodiment, for example, thinner is added to address problematic rheological profiles.

The condition indicating that there is a problematic condition may vary depending on the equipment and operator's preferences. The fluid must be pumpable and the anionic thinner may be added to ensure that the drilling fluid remains pumpable. In some example embodiments, the thinner may be added as follows:

a) when funnel viscosity reaches 70 seconds/litre;
b) when the Fann 35 YP reaches 35 Pa to 45 Pa or possibly when the yield point reaches 30 Pa (at yield point=60 Pa pumping generally becomes problematic for most rigs); or
c) using MBT, when the test indicates clay at 60 kg/m3.

Anionic thinners of interest are anionic chemicals or minerals including coal fines, lignite, lignite resin, humalite, poly-anionic cellulose, tetra potassium pyrophosphate (TKPP), sodium acid pyrophosphate, tetra sodium pyrophosphate, polyacrylic acid, polyacrylates, polyacrylate co-polymers or xanthan gum that are non-toxic to environmental ecosystems, considered by regulators to be compatible with inclusion in ground water at the concentrations used. Polyacrylate-based thinners such as polyacrylic acid, polyacrylates, polyacrylate co-polymers are of particular interest as they are considered environmentally safe and have a high activity. Suitable polyacrylate polymers typically have a molecular weight of less than 10,000 and in most cases less than 1,000 g/mol. Some anionic thinners such as caustic and tannin including sulfonated tannin (which is for example, available as Desco™) are not appropriate, as they are considered toxic to some ecosystems.

The non-toxic anionic thinner may be added to the circulating drilling fluid. If the thinner is free flowing liquid or powder, it may be added directly.

The thinner is added in an amount sufficient to bring the fluid parameters to acceptable levels. For example, thinner may be added and the fluid viscosity monitored until the fluid has a viscosity reduced to less than YP=60 Pa or possibly less than 45 Pa or in some embodiments below YP=30 Pa (for example measured using a Fann 35 rheometer). In any event, during the drilling and circulation, the yield point of the drilling fluid should be maintained above 10 Pa to provide advantageous effects.

The actual amounts of thinner used to achieve this above-noted rheological profile will vary depending on the activity of the thinner, the amount of clay contamination, etc. A useful concentration range for polyacrylate-based thinners is 0.1 to 10 L/m3 in the drilling fluid. Concentrations are dependent on desired final viscosity.

After drilling through the one or more clay deposits in the path of the borehole, the present drilling fluid may continue to be used for the remainder of the tunnel boring operation or other drilling fluids may be used. However, if clay can continue to become entrained in the drilling fluid, for example where a clay deposit remains open to contact by the drilling fluid, it may be useful to continue using the present drilling fluid until drilling is complete or the possibility of clay contamination is eliminated. If desired, the drilling fluid returning to the mud tanks at surface may be monitored to determine the concentration of salt and thinner therein, and/or other parameters indicative of problematic clay content, to ensure that fluid characteristics are maintained. For example, any one or more of the bentonite, mixed metal viscosifier, base, salt or anion thinner may be added during drilling to adjust the drilling fluid parameters. In one embodiment, for example, an amount of mixed metal viscosifier may be added to the fluid during the course of a drilling operation where reactive formations are drilled and drill cuttings become incorporated into, and change the rheology of, the drilling fluid. In such a case, the addition of an amount of mixed metal viscosifier can cause the viscosity of the fluid to increase. In another embodiment, for example, an initial amount of an anionic thinner and further amounts of that or another anionic thinner may be added to the fluid during the course of a drilling operation where reactive clay formations are drilled and clay becomes incorporated into, and changes the rheology of, the drilling fluid. In such a case, the addition of an amount of thinner can cause the viscosity of the fluid to decrease.

As noted above, other additives may be employed in the drilling fluid such as starch for fluid loss reduction, organophillic lost circulation materials (LCM), etc. Simple testing may verify the compatibility of any particular additive with the drilling fluid.

To produce the drilling fluid, the bentonite may first be hydrated in water. Then the mixed metal moiety is added and pH is adjusted. The salt can be added to the aqueous mixture of bentonite and mixed metal with or before the thinner. Additives such as LCM, fluid loss control agents, etc. can also be added when appropriate, as will be appreciated.

The following examples are included for the purposes of illustration only, and are not intended to limit the scope of the invention or claims.

EXAMPLES

Example I

A representative MMH viscosified base fluid was tested for controlled thinning with the test thinning agent short chain polyacrylate Base fluid comprised of:

Natural Bentonite=39.1 kg/m3

MMH=10.66 kg/m3

Gypsum=12.25 kg/m3

Attapulgite=17.4 kg/m3

Lime to control pH

Simulated Sea Water=13% v/v

The Base fluid was mixed and measured to which was added a concentrated aqueous (40% w/w) low molecular weight (LMW) polyacrylate polymer. The polyacrylate solution comprises of polymer that typically has a molecular weight of less than 1000 g/mol.

Results are shown in Table I

TABLE I

| Dial reading | Base | Base + 3 Kg/m3 Lignite | Base + 0.25 L/m3 (40% w/w) LMW Polyacrylate solution | Base + 0.5 L/m3 (40% w/w) LMW Polyacrylate Sol'n |
| --- | --- | --- | --- | --- |
| R600 | 100 | 97 | 67 | 47 |
| R300 | 92 | 89 | 62 | 42 |
| R200 | 87 | 85 | 59 | 39 |
| R100 | 81 | 80 | 56 | 35 |

TABLE I-continued

| Dial reading | Base | Base + 3 Kg/m3 Lignite | Base + 0.25 L/m3 (40% w/w) LMW Polyacrylate solution | Base + 0.5 L/m3 (40% w/w) LMW Polyacrylate Sol'n |
|---|---|---|---|---|
| R6 | 52 | 52 | 42 | 26 |
| R3 | 36 | 36 | 37 | 25 |
| PV (mPa · sec) | 8 | 8 | 5 | 5 |
| YP (Pa) | 42 | 40.5 | 28.5 | 18.5 |

The addition of 3 kg/m3 of lignite thinned the Base MMH viscosified fluid only marginally as expected. The addition of 40% w/v low molecular weight polyacrylate solution (a concentration in the drilling fluid of approx. 0.1 kg/m3) thins the fluid measurably but controllably. This compares with MMH viscosified fluids without the addition of calcium sulphate where the addition of polyacrylate reduces the viscosity of the Base fluid to nearly that of water.

Example II

Background: Nr Fox Creek Alberta (Crossing #26). Boring a 315 m tunnel for pipeline installation. The tunnel boring operations started with a 251 mm pilot hole using the present invention as the drilling fluid. The pilot hole was reamed to 508 mm and then to 762 mm.

Drilling Fluid: The circulating drilling fluid system for the 762 mm ream consisted of a mixture of added natural bentonite pre-hydrated in fresh water, a mixed metal hydroxide viscosifier (MMH), gypsum and lime (pH=8.0-8.5) carried over from the 508 mm ream operation and that had incorporated a significant amount of hydratable clays.

762 mm tunnel reaming operations: Made up the bottom hole assembly (BHA) with reamer and commenced reaming operations with 1.17 m3/min pump rates. Large amounts of sand were drilled and removed. The funnel viscosity was increased from 46 to 65 s/L with the addition of pre-hydrated natural bentonite and MMH. The rheology and chemical properties were monitored throughout this operation. Fluid properties are shown in Table II.

TABLE II

| | Day 1 | Day 3 |
|---|---|---|
| Distance from Entry (m) | 45 | 315 |
| Density (kg/m3) | 1150 | 1170 |
| Funnel Viscosity (s/L) | 46 | 49 |
| pH | 8.0 | 7.5 |
| 600 rpm | 45 | 55 |
| 300 rpm | 39 | 49 |
| 6 rpm | 30 | 38 |
| 3 rpm | 26 | 37 |
| 10 s - Gel strength (Pa) | 13 | 18 |
| 10 min - Gel strength (Pa) | 14 | 19 |
| PV (mPa · s) | 6 | 6 |
| YP (Pa) | 16.5 | 21.5 |
| MBT (kg/m3 bentonite equiv.) | 64 | 64 |

MBT is a measure of the amount of reactive bentonitic clays in the drilling fluid and is the sum of the intentionally added natural bentonite plus a contribution of reactive drilled clay cuttings incorporated into the drilling fluid.

The drilling fluid was successfully used to ream the tunnel from 508 mm to 762 mm through sand and clay formations. The pH was allowed to drop from 8.0 to 7.5 while maintaining advantageous rheology properties. Successfully pulled 508 mm diameter pipe through the tunnel At the end of the tunneling project:
Total volume of fluid used: 350 m3
Total weight of MMH added: 911 kg
Total weight of natural bentonite added: 7620 kg
MBT (kg/m3 bentonite equivalent): 64 kg/m3
Concentration of Bentonite added: 21.8 kg/m3
Concentration of MMH added: 2.6 kg/m3
Ratio of MBT:MMH=24.6:1

Example III

Background: Nr Fox Creek Alberta (Crossing #9). Boring a 555 m tunnel for pipeline installation. The tunnel boring operations started with a 311 mm pilot hole using the present invention as the drilling fluid. The pilot hole was reamed to 457 mm and then to 762 mm.

Drilling Fluid: The circulating drilling fluid system for the 762 mm ream consisted of a mixture of added natural bentonite pre-hydrated in fresh water, a mixed metal hydroxide viscosifier (MMH), gypsum and lime (pH=8.5) carried over from the 457 mm ream operation and that had incorporated a significant amount of hydratable clays (MBT=93 kg/m3).

762 mm tunnel reaming operations: Made up the bottom hole assembly (BHA) with reamer and commenced pull reaming operations from the exit side with 1.28 m3/min pump rates. A problematic increase in viscosity occurred once 762 mm reaming operations commenced. The pull ream operations commenced using a drilling fluid with a funnel viscosity of 125 s/L. The viscosity had been raised to this level on the previous reamed section to deal with hole cleaning and lost circulation issues. Upon commencing reaming to 762 mm the funnel viscosity increased by 39 m to 175 s/L. 3 kg/m3 of lignite and some fresh water (10 m3) was added to the system and the funnel viscosity reduced to 80 s/L. By 64 m the funnel viscosity had reduced to 64 s/L. The MBT had reduced to 71 kg/m3 equivalent through the combination of fresh water additions, possible influx of ground (aquifer) water and increased efficiency of the solids removal equipment.

The results are shown in Table III.

TABLE III

| | Day 1 (9:30 pm) | Day 2 (4 am) | Day 2 (5:30 am) |
|---|---|---|---|
| Distance from Entry (m) | (94) | 26 | 64 |
| Density (kg/m3) | 1175 | 1195 | 1140 |
| Funnel Viscosity (s/L) | 125 | 175 | 64 |
| pH | 8.5 | 8.5 | 8.0 |
| 600 rpm | 109 | 130 | 62 |
| 300 rpm | 97 | 112 | 57 |
| 6 rpm | 80 | 87 | 45 |
| 3 rpm | 74 | 76 | 44 |
| 10 s - Gel strength (Pa) | 37 | 38 | 22 |
| 10 min - Gel strength (Pa) | 37 | 38 | 22 |
| PV (mPa · s) | 12 | 18 | 5 |
| YP (Pa) | 42.5 | 47 | 26 |
| MBT (kg/m3 bentonite equiv.) | 93 | 100 | 71 |

The drilling fluid was successfully used to ream the 555 m tunnel to 762 mm through sand and clay formations with full control of the rheology properties. Successfully pulled 508 mm diameter pipe through the tunnel.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for drilling a tunnel through a formation, the method comprising:
   preparing a mixed metal-viscosified drilling fluid including bentonite, a mixed metal viscosifier which is a mixed metal layered hydroxide compound of the following empirical formula:

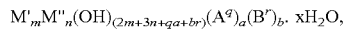

$$M'_m M''_n (OH)_{(2m+3n+qa+br)}(A^q)_a(B^r)_b \cdot xH_2O,$$

where M' represents at least one divalent metal cation and m is an amount of from greater than zero to 8; where M" represents at least one trivalent metal cation and n is an amount of from greater than zero to 6; where A is an anion or negative-valence radical, and a is an amount of A ions of valence q, provided that if A is monovalent, a is from greater than zero to 8, and if A is polyvalent, a is from greater than zero to 4; where B is a second anion or negative-valence radical, and where b is an amount of B ions of valence r and is from zero to 4; provided (m+n) is greater than or equal to 1; further provided qa+br cannot be greater than 2m+3n; provided that qa cannot equal 2m+3n; and still further provided that (2m+3n+qa+br) is less than 3; and where xH$_2$O represents excess waters of hydration, with x being zero or more; and controlling pH to 8.5 to 9.5 to permit a reaction between the bentonite and the mixed metal viscosifier;
   adding at least one of: (i) calcium sulfate and (ii) a potassium salt; and
   pumping the drilling fluid while drilling the tunnel with the pH lowered to 7-9.

2. The method of claim 1 wherein preparing the mixed metal-viscosified drilling fluid includes mixing water, 15 to 45 kg/m3 of the bentonite and the mixed metal viscosifier to obtain a viscosifier to bentonite weight ratio of 1:3 to 1:20, and
   wherein pumping proceeds while a concentration of total clay, including the bentonite and incorporated clay from the formation, increases such that the weight ratio of the mixed metal viscosifier to total clay increases to up to 1:30.

3. The method of claim 1 wherein the potassium salt is selected from potassium sulfate or potassium chloride and adding adds the potassium salt for a concentration of 1 to 5% w/v.

4. The method of claim 1 wherein adding brings the calcium sulfate to 0.05 to 1.0% w/v.

5. The method of claim 1 further comprising adding a non-toxic anionic thinner when the drilling fluid shows a problematic increase in viscosity as indicated by:
   a) a funnel viscosity of 70 seconds/L;
   b) a yield point of 30 Pa; or
   c) a methylene blue test of 60 kg/m3.

6. The method of claim 5 wherein the non-toxic anionic thinner is selected from the group consisting of: coal fines, lignite, lignite resin, humalite, poly-anionic cellulose, tetra potassium pyrophosphate (TKPP), sodium acid pyrophosphate, tetra sodium pyrophosphate, polyacrylic acid, polyacrylates, polyacrylate co-polymers or xanthan gum.

7. The method of claim 1 further comprising adding a polyacrylate anionic thinner when the drilling fluid shows a problematic increase in viscosity as indicated by:
   a) a funnel viscosity of 70 seconds/L;
   b) a yield point of 30 Pa; or
   c) a methylene blue test of 60 kg/m3.

8. The method of claim 1 wherein:
   preparing the mixed metal-viscosified drilling fluid includes mixing water, 15 to 45 kg/m3 bentonite and the mixed metal viscosifier at a weight ratio of 1:3 to 1:20 relative to the weight of the bentonite,
   pumping proceeds with a clay load increasing from incorporated drilled clay and limited addition of further mixed metal viscosifier such that the weight ratio of the mixed metal viscosifier:total clay is up to 1:30; and
   further comprising adding humalite or a polyacrylate anionic thinner when the drilling fluid shows a problematic increase in viscosity as indicated by:
   a) a funnel viscosity of 70 seconds/L;
   b) a yield point of 30 Pa; or
   c) a methylene blue test of 60 kg/m3.

9. A method for drilling a tunnel through a formation, the method comprising:
   providing a mixed metal-viscosified drilling fluid including a mixed metal viscosifier which is a mixed metal layered hydroxide corn pound of the following empirical formula:

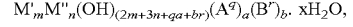

$$M'_m M''_n (OH)_{(2m+3n+qa+br)}(A^q)_a(B^r)_b \cdot xH_2O,$$

where M' represents at least one divalent metal cation and m is an amount of from greater than zero to 8; where M" represents at least one trivalent metal cation and n is an amount of from greater than zero to 6; where A is an anion or negative-valence radical, and a is an amount of A ions of valence q, provided that if A is monovalent, a is from greater than zero to 8, and if A is polyvalent, a is from greater than zero to 4; where B is a second anion or negative-valence radical, and where b is an amount of B ions of valence r and is from zero to 4; provided (m+n) is greater than or equal to 1; further provided qa+br cannot be greater than 2m+3n; provided that qa cannot equal 2m+3n; and still further provided that (2m+3n+qa+br) is less than 3; and where xH$_2$O represents excess waters of hydration, with x being zero or more; circulating the drilling fluid through the tunnel while drilling into the formation; monitoring the drilling fluid for a condition of drilling indicative of a problematic increase in viscosity of the drilling fluid; adding to the drilling fluid at least 1% w/v potassium salt; and adding a non-toxic anionic thinner to the drilling fluid to adjust the viscosity of the drilling fluid.

10. The method of claim 9 wherein providing the mixed metal-viscosified drilling fluid includes providing an aqueous-based drilling fluid including 15 to 45 kg/m3 bentonite, the mixed metal viscosifier at a weight ratio of 1:3 to 1:30 relative to the weight of bentonite and a base to maintain the pH above 7.0.

11. The method of claim 9 wherein adding a potassium salt occurs during the step of providing.

12. The method of claim 9 wherein adding a potassium salt occurs after identifying the condition of drilling indicative of a problematic increase in viscosity of the drilling fluid.

13. The method of claim 9 wherein adding a potassium salt brings the concentration of potassium salt to 1 to 5% w/v.

14. The method of claim 9 wherein providing the mixed metal-viscosified drilling fluid includes: mixing bentonite in water to form a bentonite mixture; adding a mixed metal viscosifier to the bentonite mixture; adjusting pH to pH 8.5-9.5; and adding the potassium salt.

15. The method of claim 14 wherein the pH is adjusted using lime.

16. The method of claim 9 further comprising adding any of fluid loss control additives or lost circulation materials.

17. The method of claim 9 wherein providing the mixed metal-viscosified drilling fluid provides a drilling fluid with a yield point greater than 10 Pa.

18. The method of claim 9 wherein adding an anionic thinner is initiated after identifying the condition of drilling indicative of a problematic increase in viscosity of the drilling fluid.

19. The method of claim 9 wherein adding an anionic thinner brings the fluid yield point to between 10 and 60 Pa.

20. The method of claim 9 wherein circulating the drilling fluid is initiated prior to drilling into a clay deposit.

21. The method of claim 9 wherein circulating the drilling fluid is maintained while a clay deposit is open to the drilling fluid.

22. The method of claim 9 wherein circulating the drilling fluid is initiated substantially at surface.

23. The method of claim 9 wherein monitoring includes determining the viscosity of the drilling fluid.

24. The method of claim 9 wherein monitoring includes determining the clay concentration in the drilling fluid.

25. The method of claim 9 wherein monitoring includes considering the location of the tunnel relative to a known location of a clay deposit.

26. The method of claim 9 wherein the condition of drilling indicative of a problematic increase in viscosity includes at least one of:
a) a funnel viscosity of 70 seconds/L;
b) a yield point of 30 Pa; and
c) a methylene blue test of 60 kg/m3.

27. The method of claim 9 wherein the non-toxic anionic thinner is selected from the group consisting of: coal fines, lignite, lignite resin, humalite, poly-anionic cellulose, tetra potassium pyrophosphate (TKPP), sodium acid pyrophosphate, tetra sodium pyrophosphate, polyacrylic acid, polyacrylates, polyacrylate co-polymers or xanthan gum.

28. The method of claim 9 wherein the potassium salt is selected from the group consisting of potassium sulfate, potassium chloride, potassium acetate and potassium formate.

29. The method of claim 9 wherein the potassium salt is potassium sulfate.

30. The method of claim 9 wherein the potassium salt is potassium chloride.

31. A method for drilling a tunnel through a formation, the method comprising:
providing a mixed metal-viscosified drilling fluid including a mixed metal viscosifier which is a mixed metal layered hydroxide compound of the following empirical formula:

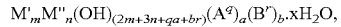

$$M'_m M''_n (OH)_{(2m+3n+qa+br)} (A^q)_a (B^r)_b \cdot xH_2O,$$

where M' represents at least one divalent metal cation and m is an amount of from greater than zero to 8; where M" represents at least one trivalent metal cation and n is an amount of from greater than zero to 6; where A is an anion or negative-valence radical, and a is an amount of A ions of valence q, provided that if A is monovalent, a is from greater than zero to 8, and if A is polyvalent, a is from greater than zero to 4; where B is a second anion or negative-valence radical, and where b is an amount of B ions of valence r and is from zero to 4; provided (m+n) is greater than or equal to 1; further provided qa+br cannot be greater than 2m+3n; provided that qa cannot equal 2m+3n; and still further provided that (2m+3n+qa+br) is less than 3; and where xH$_2$O represents excess waters of hydration, with x being greater than zero; circulating the drilling fluid through the tunnel while drilling into the formation; monitoring the drilling fluid for a condition of drilling indicative of a problematic increase in viscosity of the drilling fluid; adding calcium sulfate to the drilling fluid to bring the concentration to at least 0.05% w/v calcium sulfate in the drilling fluid; and
adding a non-toxic anionic thinner to the drilling fluid to adjust the viscosity of the drilling fluid.

32. The method of claim 31 wherein providing the mixed metal-viscosified drilling fluid includes providing an aqueous-based drilling fluid including 15 to 45 kg/m3 of bentonite, the mixed metal viscosifier at a viscosifier to bentonite weight ratio of 1:3 to 1:30 and a base to maintain the pH above 7.0.

33. The method of claim 31 wherein adding calcium sulfate occurs during the step of providing.

34. The method of claim 31 wherein adding calcium sulfate occurs after identifying the condition of drilling indicative of a problematic increase in viscosity of the drilling fluid.

35. The method of claim 31 wherein adding calcium sulfate brings the concentration of calcium sulfate to 0.05 to 1.0% w/v.

36. The method of claim 31 wherein providing the mixed metal-viscosified drilling fluid includes:
mixing bentonite in water to form a bentonite mixture;
adding the mixed metal viscosifier to the bentonite mixture;
adjusting pH to pH 8.5-9.5; and
adding the calcium sulfate.

37. The method of claim 36 wherein the pH is adjusted using lime.

38. The method of claim 31 further comprising adding any one or more of fluid loss control additives or lost circulation materials.

39. The method of claim 31 wherein providing the mixed metal-viscosified drilling fluid provides a drilling fluid with a yield point greater than 10 Pa.

40. The method of claim 31 wherein adding the non-toxic anionic thinner is initiated after identifying the condition of drilling indicative of a problematic increase in viscosity of the drilling fluid.

41. The method of claim 31 wherein adding the non-toxic anionic thinner brings the fluid yield point to between 10 and 60 Pa.

42. The method of claim 31 wherein circulating the drilling fluid is initiated prior to drilling into a clay deposit.

43. The method of claim 31 wherein circulating the drilling fluid is maintained while a clay deposit is open to the drilling fluid.

44. The method of claim 31 wherein circulating the drilling fluid is initiated at surface.

45. The method of claim 31 wherein monitoring includes determining the viscosity of the drilling fluid.

46. The method of claim 31 wherein monitoring includes determining the clay concentration in the drilling fluid.

47. The method of claim 31 wherein monitoring includes considering the location of the tunnel relative to a known location of a clay deposit.

48. The method of claim 31 wherein a condition of drilling indicative of a problematic increase in viscosity includes at least one of:
a) a funnel viscosity of 70 seconds/L;
b) a yield point of 30 Pa; and
c) a methylene blue test of 60 kg/m3.

49. The method of claim 31 wherein the non-toxic anionic thinner is selected from the group consisting of: coal fines, lignite, lignite resin, humalite, poly-anionic cellulose, tetra potassium pyrophosphate (TKPP), sodium acid pyrophosphate, tetra sodium pyrophosphate, polyacrylic acid, polyacrylates, polyacrylate co-polymers or xanthan gum.

50. A mixed metal-viscosified drilling fluid comprising:
water;
15 to 45 kg/m3 of bentonite;
a mixed metal viscosifier at a weight ratio of 1:3 to 1:30 relative to the weight of the bentonite, the mixed metal viscosifier being a mixed metal layered hydroxide compound of the following empirical formula:

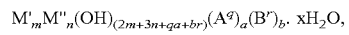

$$M'_m M''_n (OH)_{(2m+3n+qa+br)} (A^q)_a (B^r)_b \cdot xH_2O,$$

where M' represents at least one divalent metal cation and m is an amount of from greater than zero to 8; where M" represents at least one trivalent metal cation and n is an amount of from greater than zero to 6; where A is an anion or negative-valence radical, and a is an amount of A ions of valence q, provided that if A is monovalent, a is from greater than zero to 8, and if A is polyvalent, a is from greater than zero to 4; where B is a second anion or negative-valence radical, and where b is an amount of B ions of valence r and is from zero to 4; provided (m+n) is greater than or equal to 1; further provided qa+br cannot be greater than 2m+3n; provided that qa cannot equal 2m+3n; and still further provided that (2m+3n+qa+br) is less than 3; and where xH$_2$O represents excess waters of hydration, with x being zero or more;
at least one of: at least 0.05% w/v calcium sulfate or at least 1% w/v potassium salt;
a polyacrylate anionic thinner; and
a base to maintain the pH above 7.0.

51. The mixed metal-viscosified drilling fluid of claim 50 wherein the polyacrylate anionic thinner is selected from polyacrylic acid, polyacrylate or polyacrylate co-polymer.

* * * * *